F. J. MULLINS.
FISH STRINGER.
APPLICATION FILED MAY 8, 1919.
1,373,826.
Patented Apr. 5, 1921.
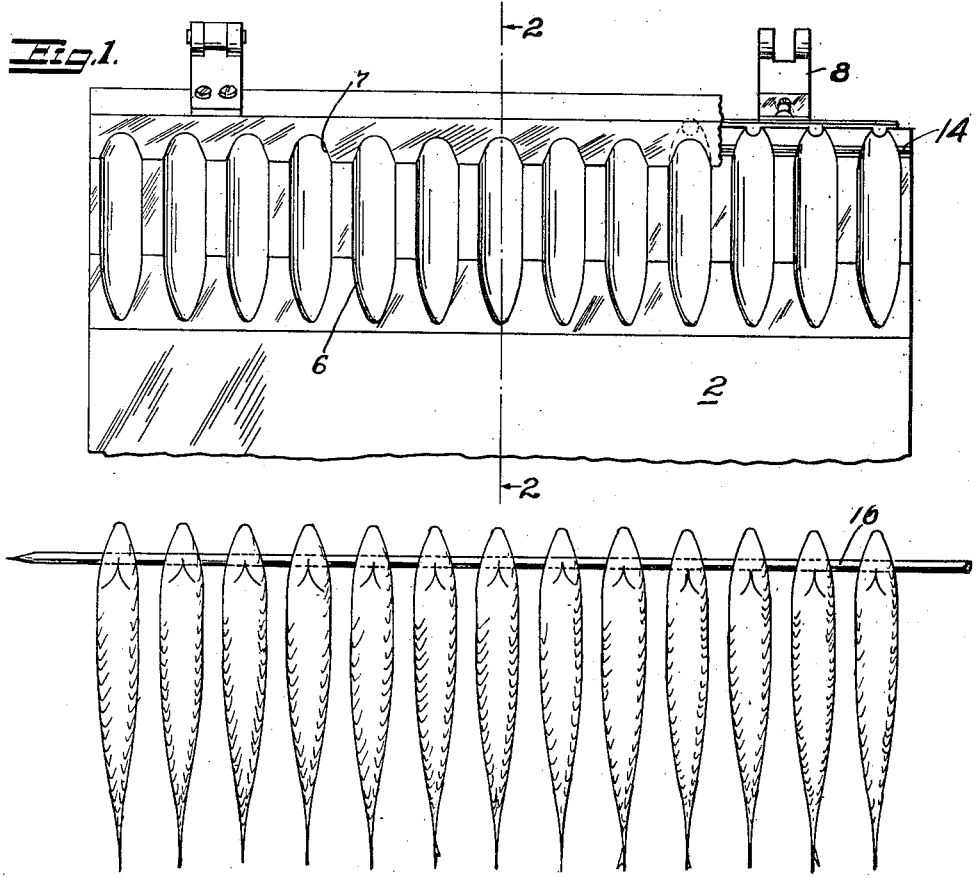
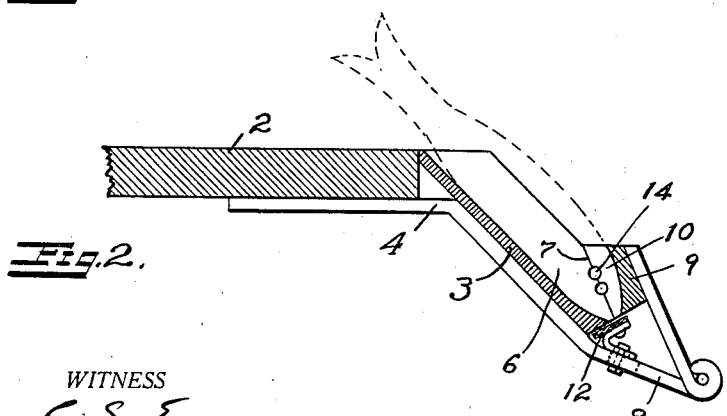
WITNESS
C. S. Evans
INVENTOR
F. J. Mullins.
BY White & Prost
ATTORNEYS

UNITED STATES PATENT OFFICE.

FRED J. MULLINS, OF PITTSBURG, CALIFORNIA, ASSIGNOR TO F. E. BOOTH CO., OF SAN FRANCISCO, CALIFORNIA, A CORPORATION OF CALIFORNIA.

FISH-STRINGER.

1,373,826.  Specification of Letters Patent.  Patented Apr. 5, 1921.

Application filed May 8, 1919. Serial No. 295,811.

*To all whom it may concern:*

Be it known that I, FRED J. MULLINS, a citizen of the United States, and a resident of Pittsburg, county of Contra Costa, and State of California, have invented a new and useful Fish-Stringer, of which the following is a specification.

My invention relates to means for stringing fish.

An object of the invention is to provide means for the rapid stringing of fish upon a suspension rod preparatory to further treatment by smoke or otherwise, whereby each fish is suspended free from contact with others so that all parts are evenly exposed and acted upon by the processing agent.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my inventions as set forth in the claims.

Referring to the drawings:

Figure 1 is a plan view of the fish stringing apparatus, a portion being broken away to disclose the structure.

Fig. 2 is a vertical section through the apparatus, taken in the plane 2—2 of Fig. 1.

Fig. 3 is an elevation of a number of fish impaled upon the suspension rod, showing the even spacing secured.

The apparatus of my invention comprises a table 2 on the edge of which a pocket plate 3 is arranged, preferably sloping downwardly from the edge of the table. The plate is supported on the table by brackets 4 and is provided with a convenient number of pockets 6 of the approximate shape and size of the lower half of the body and head of the fish to be handled therein. The upper front edge of the plate 3 is beveled in a plane or surface 7 which passes approximately through the eyes of the fish held in the pockets. Pivotally mounted on the extended ends 8 of the brackets is a pocket plate 9 complementary to the plate 3, and extending upwardly over, and having one of its faces contiguous with, the surface 7 of the lower or fixed plate. The pivoted plate is provided with pockets 10, complementary to the pockets 6 and adapted to receive the upper portion of the heads of the fish lying in the lower pockets. The shape of the pockets is such as to hold the fish with the back-bone uppermost. In Fig. 2, the position of a fish held in the apparatus is shown in dotted lines. Adjustably fixed upon the bracket extension and extending longitudinally along the lower end of the pocket plate 3 is a nose bar 12 which may be set at the desired distance from the lower end of the pockets to fix the position of the fish in the pockets.

Formed in the contiguous faces 7 of the two pocket plates are alined semi-cylindrical grooves, which register and form alined circular apertures 14 longitudinally through the device when the pivoted pocket plate is closed upon the fixed plate, and these apertures are adapted to receive and guide a stringing rod 16 which is thrust through the apparatus and the fish therein. The apertures are located opposite the eyes of the fish and preferably two sets of apertures are provided for fish of different sizes.

With the nose bar 12 adjusted to act as a stop so that the fish in the pockets lie with their eyes opposite one of the sets of apertures 14, fish are taken by the operator from the table and thrust, head and belly down, into the pockets. When the pockets are full the stringing rod is pushed through the apertures 14 and the heads of the fish lying in the pockets. The pivoted pocket plate is then swung back out of the way and the rod with the fish impaled thereon at evenly spaced intervals lifted out of the lower or fixed pocket plate, and placed on a suitable rack in the smoke or processing chamber.

The weight of the pivoted pocket plate is sufficient to keep it in place on the lower plate during the loading of the pockets, but if desired any suitable catch of well known type may be applied to the plates to hold them together during the loading.

I claim:

1. In an apparatus for stringing fish, a pocket plate for holding a plurality of fish in spaced predetermined position, a stringing rod, means for guiding the stringing rod through a portion of each pocket whereby the fish lying therein are impaled upon the rod, and means for varying the position of the fish in said pockets.

2. In an apparatus for stringing fish, a fixed pocket plate for holding a plurality of fish in spaced position, a second pocket plate complementary to said fixed plate for closing the lower portion of the pockets in said fixed plate, said plates being provided in their contiguous faces with registered grooves to form alined apertures through said apparatus, and a stringing rod adapted to be thrust through said aperture to impale the fish in said pockets.

3. In an apparatus for stringing fish, a fixed plate having pockets formed therein for holding fish in spaced predetermined position, a second plate pivoted to said first plate and having pockets therein in register with the pockets of the first named plate, the contiguous faces of said plates being provided with grooves forming alined apertures through the apparatus when the pivoted plate is closed upon the fixed plate, and a stringing rod adapted to be thrust through said apertures to impale the fish in said pockets.

In testimony whereof, I have hereunto set my hand at Pittsburg, Calif., this 16th day of April, 1919.

FRED J. MULLINS.